United States Patent
Soehnchen et al.

(10) Patent No.: US 11,229,261 B2
(45) Date of Patent: Jan. 25, 2022

(54) ILLUMINATED BELT BUCKLE FOR A SAFETY BELT DEVICE OF A MOTOR VEHICLE

(71) Applicant: Autoliv Development AB, Vargarda (SE)

(72) Inventors: Arndt Soehnchen, Hamburg (DE); Iulian Rotariu, Elmshorn (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 16/954,302

(22) PCT Filed: Dec. 10, 2018

(86) PCT No.: PCT/EP2018/084154
§ 371 (c)(1),
(2) Date: Jun. 16, 2020

(87) PCT Pub. No.: WO2019/121095
PCT Pub. Date: Jun. 27, 2019

(65) Prior Publication Data
US 2021/0085036 A1    Mar. 25, 2021

(30) Foreign Application Priority Data
Dec. 20, 2017    (DE) .................... 102017223457.1

(51) Int. Cl.
*A44B 11/25* (2006.01)
*F21V 8/00* (2006.01)
*B60Q 3/242* (2017.01)

(52) U.S. Cl.
CPC ...... *A44B 11/2565* (2013.01); *A44B 11/2523* (2013.01); *B60Q 3/242* (2017.02); *G02B 6/0008* (2013.01)

(58) Field of Classification Search
CPC ............ A45B 11/2523; A45B 11/2565; A44B 11/2523; A44B 11/2565; G02B 6/0008; B60Q 3/242
See application file for complete search history.

(56) References Cited

U.S. PATENT DOCUMENTS 4,933,818 A    6/1990    Eckmann
5,176,439 A    1/1993    Kawamura
(Continued)

FOREIGN PATENT DOCUMENTS

DE    102009047937 A1    4/2011
DE    10 2014 016520 A1    5/2016
(Continued)

OTHER PUBLICATIONS

International Search Report of the International Searching Authority for PCT/EP2018/084154 dated Feb. 14, 2019.
(Continued)

*Primary Examiner* — Thomas M Sember
(74) *Attorney, Agent, or Firm* — Dickinson Wright PLLC

(57) ABSTRACT

The present invention relates to an illuminated belt buckle (1) for a safety belt device of a motor vehicle. The illuminated belt buckle (1) comprises a housing (2), a push-button (3) displaceable in the housing (2), an insertion slot (4), bordered by an edge section (21) of the housing (2) and the push-button (3), for inserting a latch plate lockable in the belt buckle (1), at least one light source (10) and at least one light guide (11), wherein the light guide (11) is coupled to at least one light-emitting surface (12, 13) starting from a light entry surface (22). It is provided that a shielding element (14) is arranged on the light guide (11) and shields the light guide (11) at least from a housing part (7, 8, 9) of the housing (2) and/or a cavity (15) in the interior of the housing (2) in which the push-button (3) is arranged. The invention also (Continued)

relates to a method for producing such an illuminated belt buckle (1).

20 Claims, 8 Drawing Sheets

(56) References Cited

U.S. PATENT DOCUMENTS

| | | |
|---|---|---|
| 10,080,401 B2 | 9/2018 | Effenberger |
| 2012/0188778 A1 | 7/2012 | Buettner et al. |
| 2016/0031367 A1* | 2/2016 | Salter ................ B60Q 3/68 362/583 |
| 2017/0001557 A1 | 1/2017 | Fujii |
| 2017/0280830 A1 | 10/2017 | Effenberger |
| 2019/0059521 A1 | 2/2019 | Harms et al. |

FOREIGN PATENT DOCUMENTS

| | | |
|---|---|---|
| DE | 10 2016 204961 A1 | 9/2017 |
| WO | 2009/46939 A2 | 4/2009 |
| WO | 2016/097089 A1 | 6/2016 |

OTHER PUBLICATIONS

English translation of International Search Report of the International Searching Authority for PCT/EP2018/084154 dated Feb. 14, 2019.

* cited by examiner

ILLUMINATED BELT BUCKLE FOR A SAFETY BELT DEVICE OF A MOTOR VEHICLE

CROSS-REFERENCE TO RELATED APPLICATIONS

This application is a 35 U.S.C. § 371 national phase of PCT International Application No. PCT/EP2018/084154, filed Dec. 10, 2018, which claims the benefit of priority under 35 U.S.C. § 119 to German Patent Application No. 10 2017 223 457.1, filed Dec. 20, 2017, the contents of which are incorporated herein by reference in their entirety.

FIELD OF THE INVENTION

The present invention relates to an illuminated belt buckle for a safety belt device of a motor vehicle.

BACKGROUND

Belt buckles for safety belt devices of motor vehicles serve in general to securely lock to a vehicle a latch plate movably guided on a belt webbing or securely connected to an end of a belt webbing. For this purpose, the belt buckle has an insertion slot for the latch plate and a locking mechanism which can be released via a push-button. The locking mechanism is spring-loaded and automatically locks the latch plate upon insertion into the insertion slot. To release the latch plate, the occupant presses down the push-button, whereby the locking mechanism is released and the latch plate is ejected by a released spring force of the locking mechanism.

Such belt buckles have long been prior art. A problem of such belt buckles is that to buckle up, the occupant has to find the comparatively narrow insertion slot of the belt buckle into which he inserts the latch plate for buckling the safety belt.

It is known from DE 39 04 125 A1 to provide a light source on the belt buckle which is coupled to predetermined light-emitting surfaces of the belt buckle via a light-conducting material. The light-emitting surfaces in this case are the push-button itself and a radiating surface arranged on a side face of the insertion slot opposite the push-button. Since the push-button must be designed to be displaceable for its function, the light-conducting material fixedly arranged in the push-button must be positioned in the push-button in such a way that the light entry surface of the light-conducting material is photometrically connected to the external light source when the push-button is in the non-pressed position. If the light entry surface of the light-conducting material in this position is not photometrically connected to the external light source due to production-related shape deviations or mechanical influences, the light is not or not completely fed into the push-button so that the push-button itself does not illuminate, or illuminates more weakly than desired.

It is further known from DE 10 2007 047 704 A1 to provide a light guide in the belt buckle which light guide has at least two light-emitting surfaces which are arranged at the ends of the insertion slot. The light-emitting surfaces themselves are triangular in shape and arranged in a free triangular area of the front side of the housing between the edge of the housing and a conical side face of the push-button. The light-emitting surfaces are dimensioned in particular in such a way that they fill the free areas in the corners of the front side of the housing as extensively as possible in order to achieve the best possible luminosity.

DE 10 2016 204 961 A1 discloses an illuminated belt buckle for a safety belt device in a motor vehicle. The illuminated belt buckle includes a housing, a push-button that can be moved within the housing, and an insertion slot, bordered by an edge section of the housing and the push-button, for inserting a latch plate. A light source, which is coupled to a light guide, is provided on the illuminable belt buckle, wherein the light guide branches from the light entry surface into two branches separated from one another.

A feature of the present invention is to achieve a particularly efficient and uniform illumination of the light-emitting surface of an illuminated belt buckle of the generic type, and to reduce the risk of the light guide being dirtied or damaged.

SUMMARY AND INTRODUCTORY DESCRIPTION OF EMBODIMENTS OF THE INVENTION

In order to achieve the above-described object, an illuminated belt buckle is proposed as described herein.

According to a feature of the invention, it is proposed that a shielding element is arranged between the branches of the light guide and shields the light guide at least from a housing part of the housing and/or a cavity in the interior of the housing in which the push-button is arranged.

The advantage of the proposed solution is that stray light is avoided in the housing. A better luminous efficiency at the radiating surface or radiating surfaces of the illuminated belt buckle can thereby be achieved. Furthermore, stray light is avoided which could otherwise exit the slot for insertion of the latch plate. The contrast at the radiating surfaces can thereby be improved, and the finding of the insertion slot can thus be facilitated. Furthermore, the shielding element protects the light guide and the light source from dirt, dust or liquid which can penetrate into the housing through joints between the housing parts or through the insertion slot for the latch plate.

For some applications, it is advantageous if the light guide has a light entry surface assigned to the light source and two light-emitting surfaces separated from one another, wherein the light guide branches from the light entry surface into two branches separated from one another, wherein one of the light-emitting surfaces is respectively assigned to one of the branches. The light source can thereby be arranged at a greater distance from the light exit surface. By means of the proposed solution, the light coupled into the light guide is distributed to two light exit surfaces and is coupled therefrom into the two light guide bodies. The light guide thus practically forms a branching of the luminous flux emanating from the light source. A single light source can thereby be used for illuminating the two light-emitting surfaces. The light guide branches from the light entry surface into two branches separated from one another, wherein one of the light exit surfaces is respectively assigned to one of the branches. The branches of the light guide serve for separately guiding the two luminous fluxes separated from one another after the branching to the light entry surfaces of the light guide bodies. In this case, the branches of the light guide can have any desired shape and can be run as desired by a flexible design of the light guides in the belt buckle depending on the available space conditions.

According to a preferred embodiment of the invention, it is proposed that the shielding element shields the light guide from an undercap of the housing. Shielding the light guide from the undercap of the housing shields the part of the illuminated belt buckle that is critical with regard to potential impairment of the light guide or stray light.

In a preferred embodiment of the illuminated belt buckle, it is provided that the shaping of the shielding element is adapted to the shape of the light guide. This results in particularly efficient shielding of the light guide from damage and dirt ingress. In addition, the cavity in the interior of the housing can be substantially retained by a shielding element adapted to the light guide so that there is sufficient space to arrange the locking mechanism of the belt buckle and the push-button in this region.

According to a preferred embodiment of the illuminated belt buckle, it is provided that the light guide has a shape which runs in a first section in parallel to a front face of the housing and dips in a second section into a cavity of the belt buckle enclosed by the housing. In this way, on the one hand, an extensive radiating surface can be achieved through the first section, which preferably runs directly along the contour of the insertion slot for the latch plate, and on the other hand, the second section of the light guide allows easy accommodation and centering of the light guide in an injection molding tool, as a result of which the light guide can be accommodated with positional precision. Manufacturing-related tolerances and scatter can thus be reduced. Furthermore, the risk of the light guide being damaged in the manufacturing or assembly process is reduced.

In this case, it is preferred if the first section extends over an angle segment of 180° to 320°. As a result, the first section is sufficiently large to allow complete illumination at least along the insertion slot, thereby facilitating the finding of the insertion slot. Furthermore, there is no completely peripheral radiating surface, which facilitates the accommodation and centering of the light guide in an injection molding tool.

In this case, it is particularly preferred if the first section extends over an angular range of 240° to 300°. An angular range of 240° to 300° is particularly advantageous since illumination in such an angular range is possible both in parallel to the insertion slot and at the short side edges of the insertion slot. In this case, with a span of a maximum of 300°, it is achieved that there is sufficient distance between the two ends of the radiating surface in order to arrange the push-button and the closing mechanism between these two ends. The risk of damage to the light guide during the assembly of the illuminated belt buckle is thus reduced.

Furthermore, it is advantageously provided that on the housing is formed a front face into which the latch plate is inserted for locking, wherein the light guide and/or the light-emitting surface(s) have an annular shape which is offset from the plane of the front face. Easier accommodation of the light guide in an injection molding tool is likewise possible due to a region of the light guide that is recessed from the front face.

In a preferred embodiment of the invention, it is provided that the light guide and the shielding element are integral. An integral design can simplify the assembly of the illuminated belt buckle and reduce the production costs for the belt buckle.

It is preferred in this case if the light guide and the shielding element are produced in a two-component injection molding process. A particularly simple and cost-effective production method is two-component injection molding, in which the light guide is produced from an optically conductive first plastic material and the shielding element is produced from a correspondingly optically shielding second plastic material.

Alternatively, it is advantageously provided that the light guide and the shielding element are connected to one another in a material bond and/or form fit by an injection molding process. As an alternative to a two-component injection molding process, it is possible to produce the light guide in a first injection molding process and the shielding element in a subsequent second injection molding process, and to connect the components to one another in a material bond and/or form fit in this second injection molding process. For this purpose, a corresponding shaping, in particular a groove running along the light guide direction, can be provided on the light guide in order to improve the form fit between the light guide and the shielding element.

This is particularly preferred if the light guide is produced from a polycarbonate or a polymethyl methacrylate (PMMA). Polycarbonate or polymethyl methacrylate are dimensionally stable, transparent plastics which are light-conducting and are comparatively insensitive to mechanical damage. Polycarbonate and polymethyl methacrylate can be processed in an injection molding process so that simple and cost-effective production of such a light guide is possible.

In an alternative embodiment of the invention, it is advantageously provided that the shielding element is connected to the light guide in a form fit. A form-fitting connection ensures that the shielding element no longer moves relative to the light guide after assembly and can thus perform its function over the long term. A form fit in the form of a clip connection between the light guide and the shielding element that is reversibly releasable without damage is particularly preferred. As a result, a faulty or damaged component can easily be replaced, as a result of which the failure costs during assembly can in particular be reduced.

Alternatively, a force fit of the shielding element between at least two housing parts or a housing part and the light guide is provided. In this case, the shielding element is preferably clamped in such a way that it remains secure in position at its location even under the usual operation-related stresses of a belt buckle and can thus reliably fulfill the shielding function.

In a preferred embodiment of the invention, it is provided that the light guide is connected in a form fit to a housing part, in particular to a housing shell, of the housing. Exact positioning of the light guide can be achieved by a form-fitting connection of the light guide to the housing. Possible damage to a loose branch of the light guide by a latch plate inserted into the belt buckle can thereby be avoided.

According to an advantageous embodiment of the illuminated belt buckle, it is provided that the distance between the branches in the unloaded initial state is greater than the inner housing width of the housing so that a prestressing of the branches results when the light guide is inserted into the housing. This results in an interference fit which allows the branches of the light guide to rest on the walls of the housing in a dimensionally stable manner. Furthermore, gaps are avoided in this way, which can lead to additional stray light and require additional shielding.

In a further improvement of the invention, it is provided that the shielding element consists of an elastomer or is encased by an elastomer. Sealing of the electronics of the illuminated belt buckle against liquid entering the belt buckle can be achieved by means of a shielding element made of an elastomer, or a shielding element encased with an elastomer. In addition to the mechanical protection and the reduction of the stray light, the risk of failure of the illumination of the belt buckle can thus be reduced in another way.

According to an advantageous development of the illuminated belt buckle, it is provided that the light-emitting surface has a linear contour, the shape of which is adapted to the shaping of an edge side of the push-button arranged laterally in the viewing direction toward the insertion slot. In this case, the actuation of the push-button is facilitated in that the belt buckle has a basic orientation, in which the push-button is always arranged on the same side of the light-emitting surface, both in the buckled normal position and in the unloaded or unbuckled position. Since the insertion slot is also always arranged in a fixed orientation with respect to the push-button, it too can thereby be found more easily for the buckling process.

In a preferred embodiment, two light-emitting surfaces are provided on the illuminated belt buckle and are arranged on different, opposite edge sides of the push-button. The push-button is thereby framed on both sides by the two light-emitting surfaces so that the position of the push-button between the light-emitting surfaces is unambiguously defined and can thus be found particularly easily with luminous light-emitting surfaces. For this purpose, the push-button itself does not have to be detectable; the occupant merely has to press with the finger on the surface located between the luminous light-emitting surfaces in order to release the latch plate and initiate the unbuckling process.

Alternatively, it is advantageously provided that the light-emitting surface is designed as a preferably continuous strip surrounding the push-button in a partial segment. This makes particularly simple operation of the push-button possible during the unbuckling process since the occupant can find the push-button particularly well in that he only has to press a point within the area bordered by the continuously surrounding strip.

According to the invention, a method is proposed for producing an illuminated belt buckle for a safety belt device of a motor vehicle. The illuminated belt buckle has a housing, a push-button displaceable in the housing, an insertion slot, bordered by an edge section of the housing and the push-button, for inserting a latch plate lockable in the belt buckle, and at least one light source and at least one light guide, wherein the light guide branches from a light entry surface into two branches which are separated from one another and which are coupled to at least one light-emitting surface. According to the invention, it is proposed that a shielding element is arranged between the branches of the light guide and shields the light guide at least from a housing part of the housing and/or a cavity in the interior of the housing in which the push-button is arranged. By means of a corresponding method, simple and cost-effective production of an illuminated belt buckle is possible which overcomes the disadvantages known from the prior art.

BRIEF DESCRIPTION OF THE DRAWINGS

The invention is explained below using preferred embodiments with reference to the accompanying figures. Identical components or components with the same function are identified by the same reference signs in the figures. In the figures.

DETAILED DESCRIPTION

Figure 1:
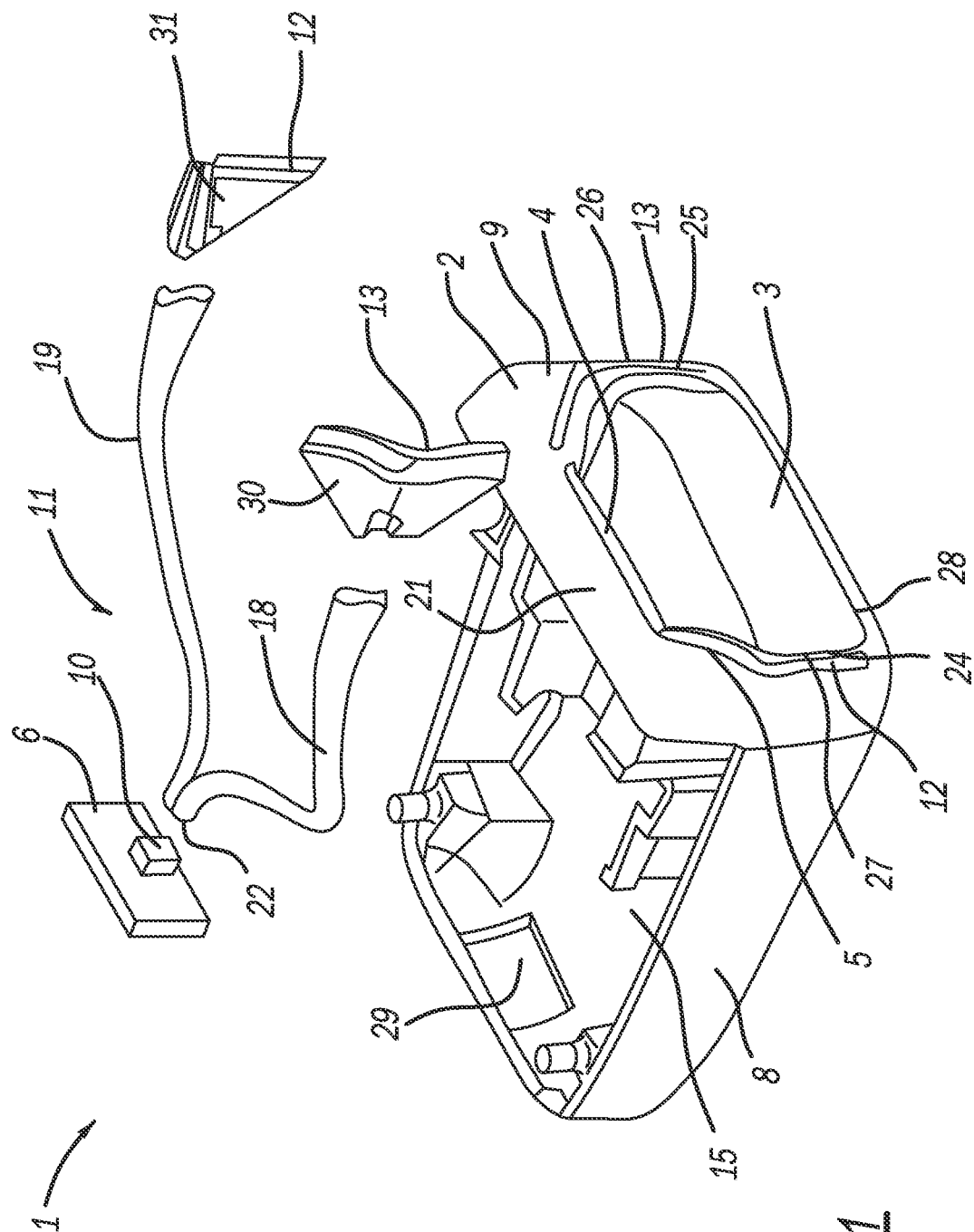
FIG. 1 shows a housing of an illuminated belt buckle having a two-branch light guide and two light-emitting surfaces.

FIG. 1 shows one half of a housing 2 of an illuminated belt buckle 1 of a safety belt device for a vehicle. A push-button 3 is provided in the housing 2 and is displaceably guided in the housing 2 and is accessible through an opening 28 in the front side 5 of the housing 2. Furthermore, a locking mechanism, not shown for the sake of clarity, is provided in the housing 2 and can be released by pressing down the push-button 3 or inserting the push-button 3 into the housing 2. After the assembly of the locking mechanism, the half of the housing 2 that can be seen is completed by a second half, not shown, so that the locking mechanism is surrounded by the housing 2 on all sides.

The push-button 3 and the opening 28 in the housing 2 are dimensioned such that an insertion slot 4 exists between the push-button 3 and an edge section 21 of the housing 2, into which insertion slot a latch plate of the safety belt device can be inserted for locking in the locking mechanism of the belt buckle. The insertion slot 4 is bordered laterally by the push-button 3 on one side and by the edge section 21 of the housing 2 on the other side. Two slots 26 and 27 are provided in the housing 2 on the side of the push-button 3 and have a profile adapted to the profile of the adjacent edge sides 24 and 25 of the push-button 3. The shape of the opening 28 in the housing 2 corresponds at least approximately to the cross-sectional shape of the push-button 3 so that the slots 26 and 27 also run in parallel to the edges of the housing 2 forming the opening 28. Furthermore, a seat 29 which is open on one side and in which a carrier plate 6 with a light source 10 fastened thereupon, preferably in the form of an LED, can be fastened, is provided on the side of the half of the housing 2 facing away from the opening 28. In addition to the light source 10, various memory and computational modules for actuating the light source 10 and/or for processing other signals, such as a belt buckle switch, can additionally also be provided on the carrier plate 6. In particular, a color change module is provided, wherein the illuminated belt buckle 1 is illuminated red by the color change module when the latch plate is not inserted into the insertion slot 4 and, when a latch plate is inserted, is illuminated white, green or in a color different from red and appropriate for interior illumination or dashboard illumination of the motor vehicle.

Furthermore, a light guide 11 and two light-emitting elements 30 and 31 are provided in the housing 2. The light-emitting elements 30 and 31 are formed from a dimensionally stable transparent plastic, such as polycarbonate or PMMA, with light-conducting properties. The shaping of the light-emitting surfaces is adapted to the slots 26 and 27 so that the light-emitting elements 30 and 31 can each be inserted into one of the slots 26 and 27 from the inside of the housing 2. Alternatively, however, the light-emitting elements 30 and 31 can also be at least partially encapsulated by the plastic of the housing 2 in a two-component spray process. Preferably, the light guide 11 is at least largely surrounded by an air gap in order to achieve a maximum luminous efficiency.

The light guide 11 has a light entry surface 22 which, when the light guide 11 is in the fixed position, is opposite the light source 10 so that the light emitted by the light source 10 enters the light guide 11. Starting from the light entry surface 22, the light emitted by the light source 10 is first forwarded in an initial section of the light guide 11 to a branching point in which the light guide 11 branches into two branches 18 and 19. The light is then further forwarded into the branches 18 and 19 to a light-emitting surface 12 and 13 on the front sides of the branches 18 and 19. The branches 18 and 19 are dimensioned and flexible in such a way that they can be run in a curved path in the cavity 15 of the housing 2 in accordance with the available installation space conditions. The light emitted by the light source 10 is thus first introduced through the light entry surface 22 into the light guide 11, then further forwarded through the branches 18 and 19 to the light-emitting surfaces 12 and 13. The proposed solution of using a central light source 10, a light guide 11 and the two light-emitting elements 30 and 31 has the advantage that the light source 10 with the carrier plate 6 can be arranged at a location favorable for mounting and contacting, and that the light can be guided via the light guide 11 and the light-emitting elements 30 and 31 to a predetermined location and radiated there. Consequently, the placement of the light source 10 and the location of the light-emitting surfaces 12 and 13 can be chosen practically independently of each other. Alternatively, however, the light-emitting surfaces 12 and 13 can also be formed by self-luminous, electrically activatable films or by gas-filled light sources.

The light-emitting surfaces 12 and 13 are of linear design and have a profile adapted to the adjacent edge sides 24 and 25 of the push-button 3. Furthermore, the light-emitting surfaces 12 and 13 extend to the ends of the insertion slot 4 and enclose the insertion slot 4 therebetween. The light-emitting surfaces 12 and 13 and the insertion slot 4 thereby practically form a line surrounding the push-button 3 on three sides. In this case, the light-emitting surfaces 12 and 13 preferably have an identical or smaller width than the insertion slot 4 so that the occupant always reaches the insertion slot 4 with the latch plate when the occupant positions the front side of the latch plate above a position connecting the light-emitting surfaces 12 and 13 and then moves it in the direction of the belt buckle. Furthermore, the light-emitting surfaces 12 and 13 include the front face located in the opening 28 of the housing 2 through the push-button 3 so that the occupant can very easily reach the push-button 3, even in the dark, by simply pressing on the surface between the light-emitting surfaces 12 and 13.

Figure 2:
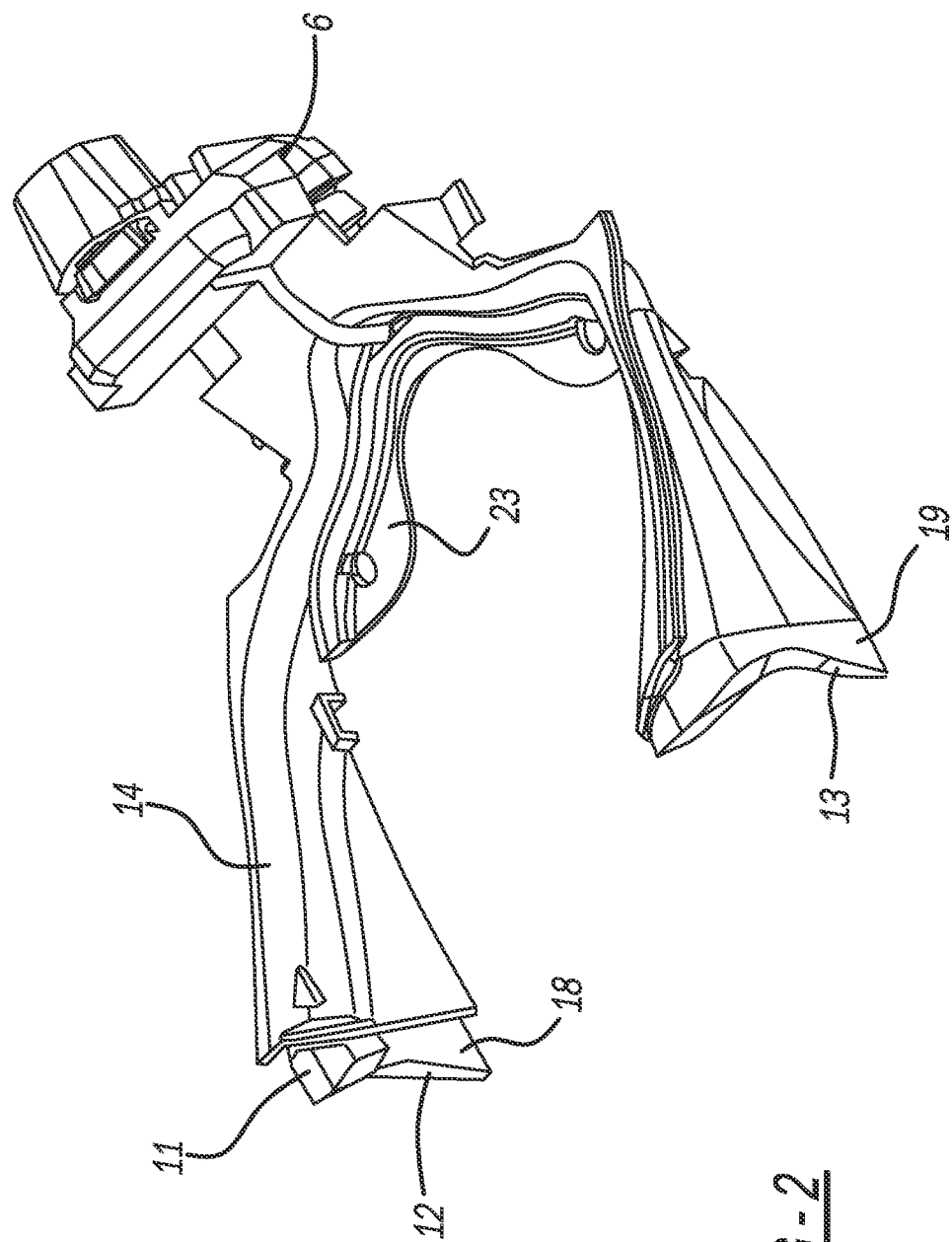
FIG. 2 shows a light guide of an illuminated belt buckle according to the invention, which light guide is covered at least sectionally by a shielding element.

FIG. 2 shows the light guide 11 of an illuminated belt buckle 1 according to the invention. The light guide 11 has a light entry surface 22 which is coupled to a light source 10 arranged on a carrier plate 6. The light guide 11 branches off from the light entry surface 22 in the manner of an antler into two branches 18 and 19, as a result of which it is possible to supply two light-emitting surfaces 12 and 13. Alternatively, a further branching of the light guide into more than two branches, in particular into three or four branches, is also possible, wherein it is provided that the branches 18 and 19 each branch once again and thus form a total of four branches with four light-emitting surfaces.

Arranged between the branches 18 and 19 of the light guide 11 is a shielding element 14 which is adapted to the shape of the light guide 11. In this case, the shielding element 14 is arranged on the sides of the light guide 11 facing away from the housing 2 and has an overlap of at least 100%, preferably 120% to 200%, relative to these surfaces in order to efficiently protect the light guide 11 from mechanical damage and at the same time shield stray light which could otherwise enter the cavity 15 in the interior of the housing 2. Furthermore, the shielding element can shield the light source 10 and other electronics arranged on the carrier plate 6 for controlling the light source against moisture penetrating into the belt buckle 1 and thus improve the durability of the illuminated belt buckle 1.

Figure 3:
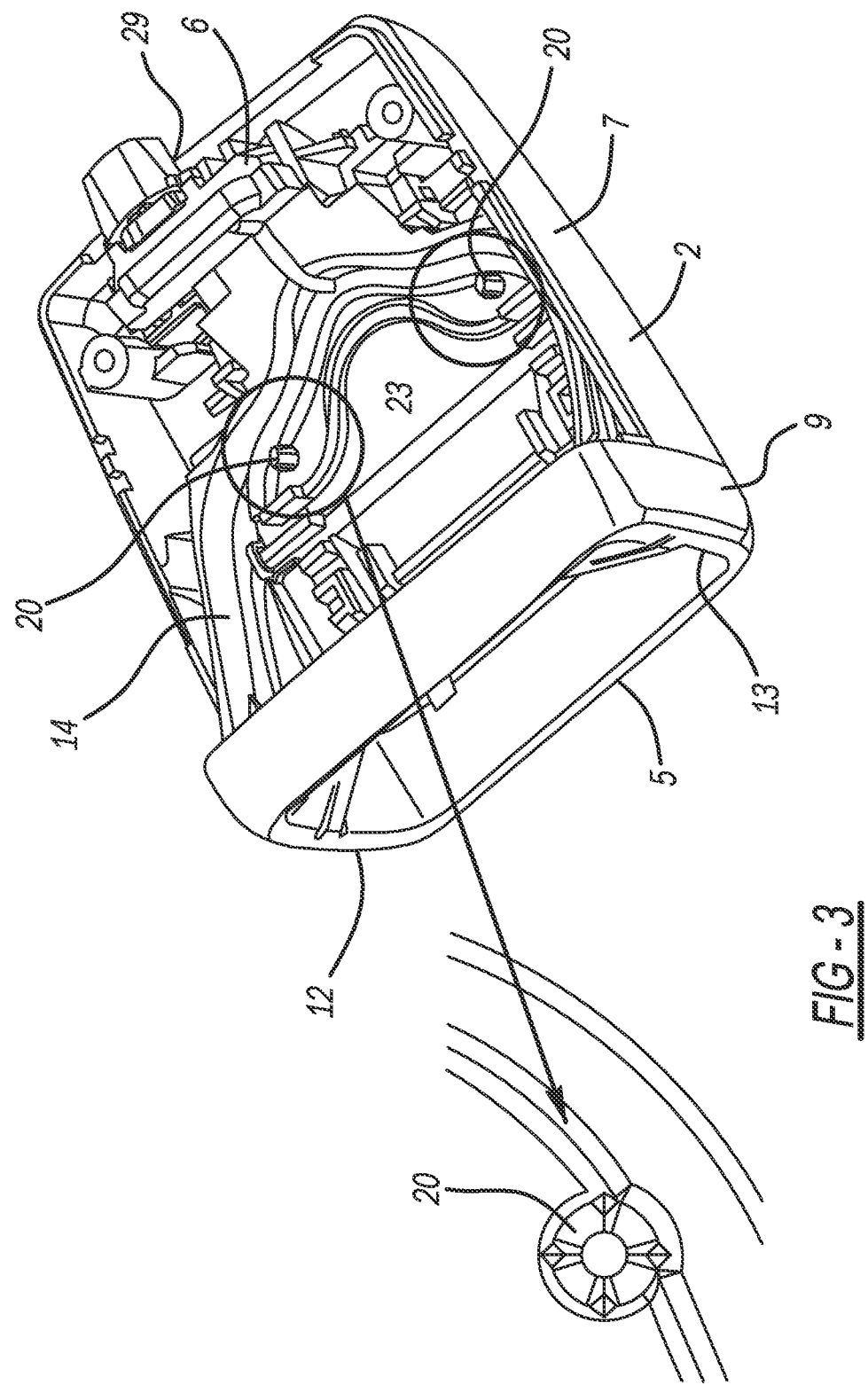
FIG. 3 shows a further illustration of an illuminated belt buckle according to the invention.

FIG. 3 shows an illuminated belt buckle 1 according to the invention in a three-dimensional representation. Pins 20 are formed on the housing 2 and cause the light guide 11 and/or the shielding element 14 to spread. As a result, the light guide 11 and/or the shielding element 14 can be fixed securely in a fixed position. In addition, the open ends of the branches 18, 19 can be pressed against the housing 2 by the spreading so that the branches 18, 19 bear against the respective housing part 7, 8. Furthermore, a seat 23 can be formed on the shielding element 14, via which seat the shielding element 14 can be connected to the pins 20 in a form fit.

Figure 4:
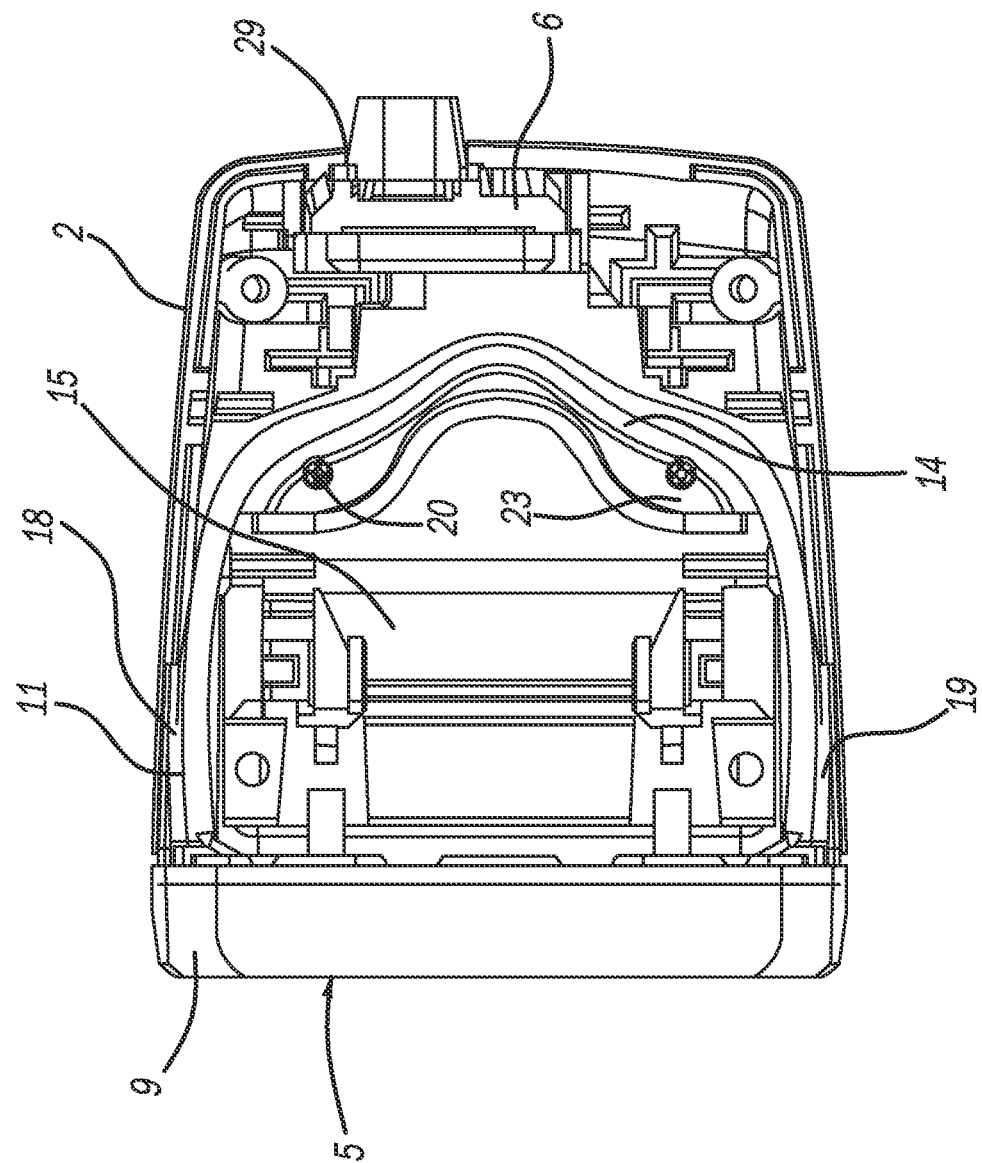
FIG. 4 shows a plan view of an illuminated belt buckle according to the invention in which the upper housing part has been removed.

FIG. 4 shows a plan view of an open housing 2 of an illuminated belt buckle 1 according to the invention. In this case, the branches 18, 19 of the light guide 11 are oversized with respect to the inner width of the housing 2 due to the prestressing so that an interference fit results. As a result, the open ends of the branches 18, 19 adjoin the housing 2. In addition or alternatively, the branches 18, 19 can be guided through a form fit with the housing 2. As shown in FIG. 3, the branches 18, 19 are prestressed by a seat 23 on the shielding element 14 through which the branches 18, 19 are spread and fixed in the region of the light source 10.

Figure 5:
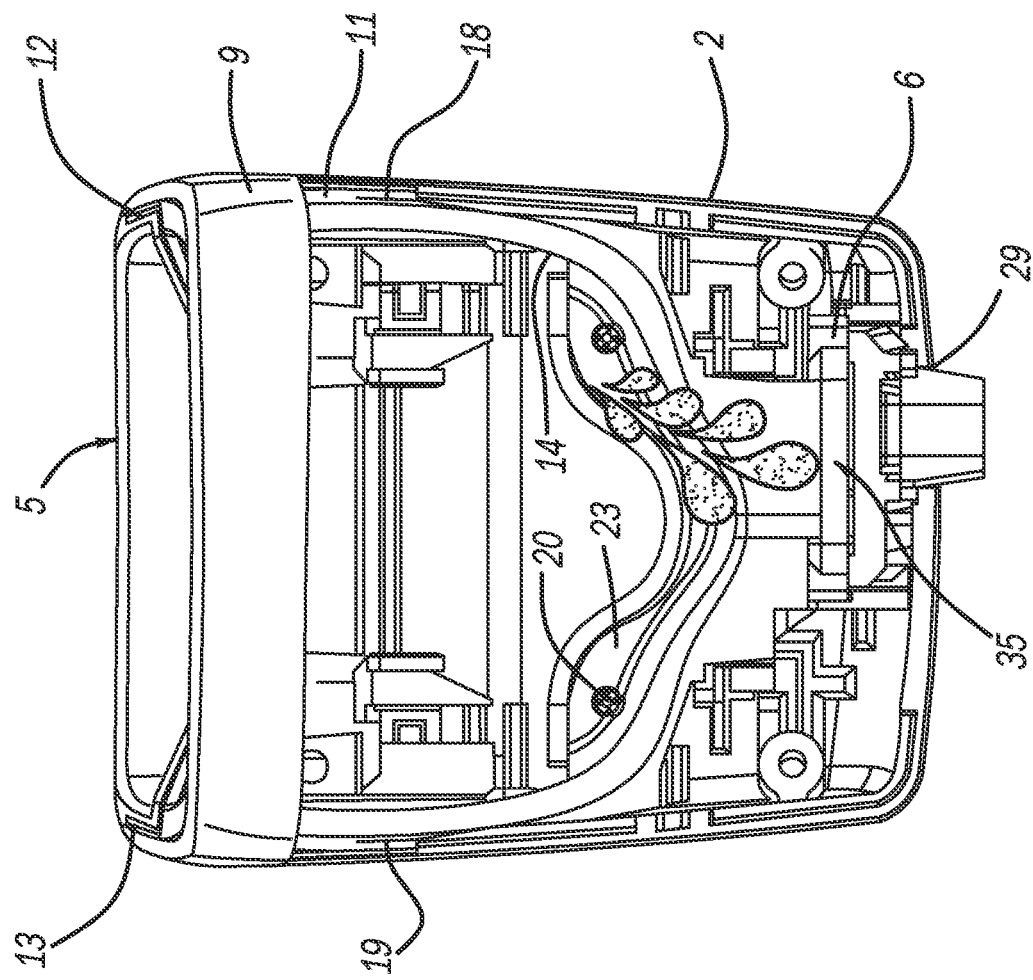
FIG. 5 shows a further plan view of an illuminated belt buckle according to the invention in which the upper housing part has been removed.

FIG. 5 shows a further plan view of an illuminated belt buckle 1 according to the invention. It can be seen that the shielding element 14, in addition to its function of shielding stray light from the light source 10 and/or the light guide 11, also serves as an additional seal in order to keep the electrical system of the illuminated belt buckle 1 dry and to keep liquid penetrated into the housing 2 away from the electronics of the illuminated belt buckle. The carrier element 5, the light source 10 and further electronics for controlling the illumination of the illuminated belt buckle 1 can be combined in an illumination unit 35.

Figure 6:
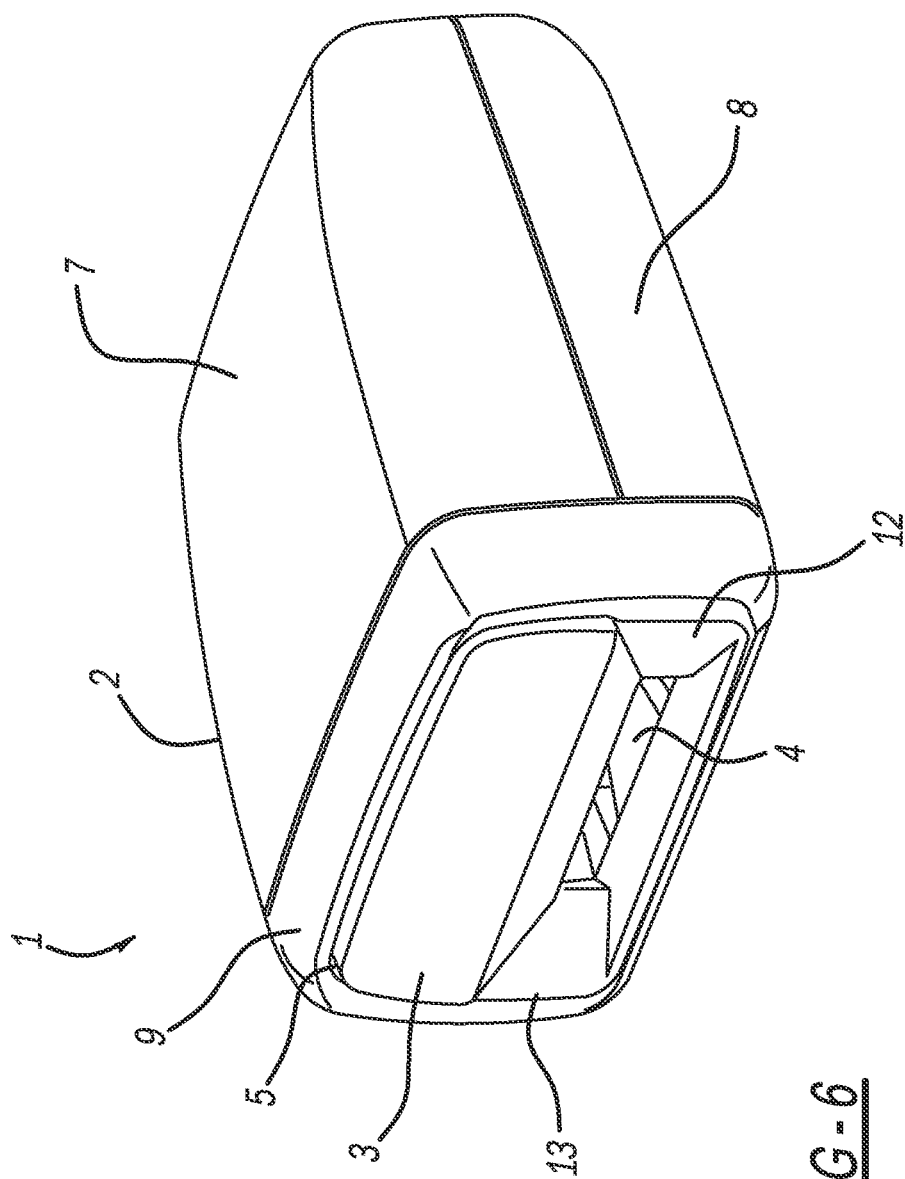
FIG. 6 shows a front view of a front face of an illuminated belt buckle according to the invention.

FIG. 6 shows a front view of a front face 5 of the illuminated belt buckle 1. It can be seen that in a cover 9 of the housing 2, an opening 28 is formed, in which a push-button 3, not shown, is arranged. Furthermore shown on the cover 9 is a recess on which an insertion slot 4 is formed between the push-button 3 and the cover 9, into which insertion slot a latch plate can be inserted. Two light-emitting surfaces 12, 13 which make it easier to find the insertion slot 4 are formed on the cover 9. The cover 9 is preferably made of an opaque plastic, while the light-emitting surfaces 12, 13 are made of a light-conducting plastic, in particular a polycarbonate or a PMMA, and form the termination of the branches 18, 19 of the light guide 11.

Figure 7:
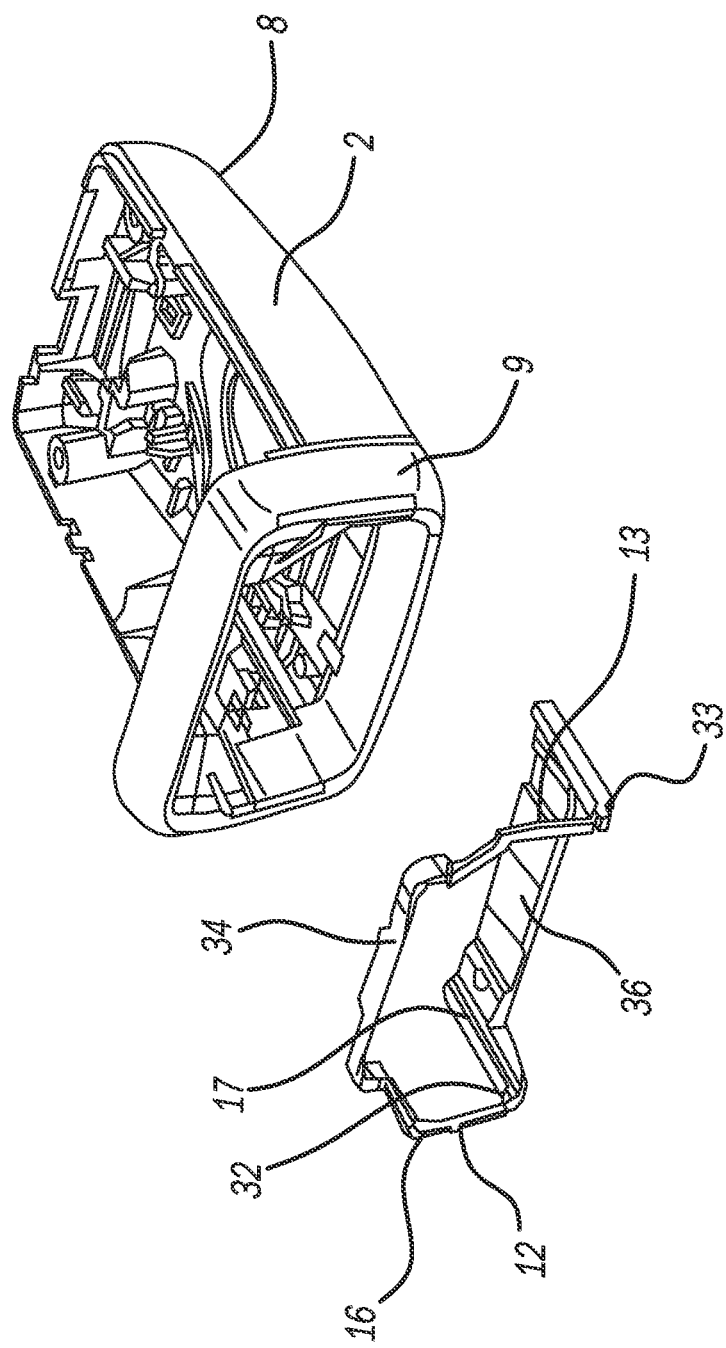
FIG. 7 shows an alternative exemplary embodiment of an illuminated belt buckle.

FIG. 7 shows another exemplary embodiment of an illuminated belt buckle 1 according to the invention. An insert element 36 is inserted into the cover 9 with substantially the same design as that of FIGS. 1 to 6. The insert element 36 has a circumferential ring section 34 on which the light-emitting surfaces 12, 13 are formed. The circumferential ring section 34 has a first section 16 which runs in parallel to the front face 5 of the belt buckle 1, and a second section 17 which dips into the belt buckle 1 from the plane of the front face 5. The circumferential ring section 34 on the front face 5 runs in parallel to the front face 5 over a segment of approximately 270°, wherein it dips into the housing 2 at the respective end 32, 33 of the annular section 34 perpendicularly to the front face 5 of the housing 2. Due to the shaping of the light guide 11, a simplified connection to the light-emitting surfaces 12, 13 of the insert element 36 is possible. Due to the circumferential ring section 34 and the second section 17 which is preferably formed to be perpendicular to the plane of the front face 5, easier accommodation and centering of the insert element 36 in an injection molding tool is possible.

Figure 8:
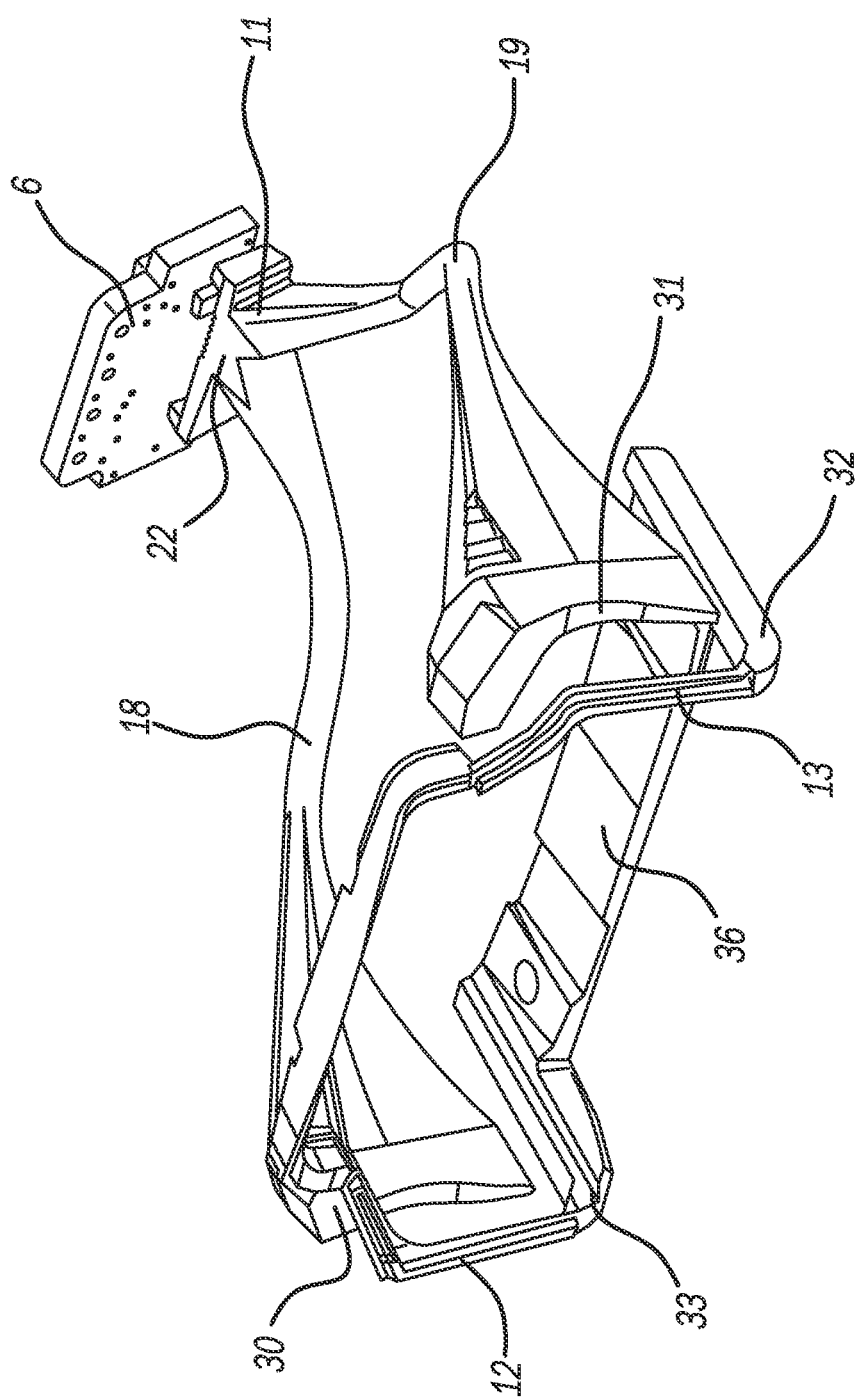
FIG. 8 shows an alternative light guide for an illuminated belt buckle according to the invention.

FIG. 8 shows another exemplary embodiment of a light guide 11 of an illuminated belt buckle 1 according to the invention. The light guide 11 branches from a light entry surface 22 into a first branch 18 and a second branch 19 at the ends of which a light-emitting element 30, 31 is formed. The light emerging from the light-emitting elements 30, 31 is coupled into the circumferential ring section 34 of the insert element 36 and emitted via the light-emitting surfaces 12, 13. By means of a form-fitting and/or force-fitted accommodation of the insert element 36 in the housing 2, a simple centering of the insert element 36 relative to the light guide 11 is possible so that the luminous efficiency can be optimized.

While the above description constitutes the preferred embodiment of the present invention, it will be appreciated that the invention is susceptible to modification, variation and change without departing from the proper scope and fair meaning of the accompanying claims.

The invention claimed is:

1. An illuminated belt buckle for a safety belt device of a motor vehicle comprising,
   a housing,
   a push-button displaceable in the housing,
   an insertion slot, bordered by an edge section of the housing and the push-button, for inserting a latch plate lockable in the belt buckle, and
   at least one light source and at least one light guide,
   wherein the light guide is coupled to at least one light-emitting surface and a light entry surface receiving light from the light source,
   wherein a shielding element is arranged on the light guide, and shields the light guide at least from a housing part of the housing or a cavity in the interior of the housing in which the push-button is arranged, and
   wherein the housing is formed with a pin and the shielding element is formed with a seat such that the seat of the shield element is connected to the pin of the housing in a form fit.

2. An illuminated belt buckle according to claim 1, further comprising the light guide branches from the light entry surface into two branches separated from one another.

3. An illuminated belt buckle according to claim 2, further comprising the shielding element is arranged between the two branches of the light guide.

4. An illuminated belt buckle according to claim 2, further comprising the distance between the two branches in an unloaded initial state is greater than an inner housing width of the housing so that the two branches are prestressed when the light guide is inserted into the housing.

5. An illuminated belt buckle according to claim 1, further comprising the shielding element shields the light guide from an undercap of the housing.

6. An illuminated belt buckle according to claim 1, further comprising a shaping of the shielding element conforms to the shape of the light guide.

7. An illuminated belt buckle according to claim 1, further comprising the light guide has a shape which extends in a first section in parallel to a front face of the housing and dips in a second section into a cavity of the belt buckle enclosed by the housing.

8. An illuminated belt buckle according to claim 7, further comprising the first section extends over an angle segment of 180° to 320°, or over an angle segment of 240° to 300°.

9. An illuminated belt buckle according to claim 1, further comprising,
   a front face, into which the latch plate is inserted for locking, is formed on the housing, wherein
   the light guide or the at least one light-emitting surface have an annular shape which is offset from the plane of the front face.

10. An illuminated belt buckle according to claim 1, further comprising the light guide and the shielding element are integral.

11. An illuminated belt buckle according to claim 10, further comprising the light guide and the shielding element are bonded to one another.

12. An illuminated belt buckle according to claim 11, further comprising the light guide is made of a polycarbonate or a polymethyl methacrylate (PMMA).

13. An illuminated belt buckle according to claim 1, further comprising the shielding element is connected in a form fit to the light guide.

14. An illuminated belt buckle according to claim 1, further comprising the light guide is connected in a form fit to the housing part of the housing.

15. An illuminated belt buckle according to claim 1, further comprising the shielding element consists of a thermoplastic.

16. An illuminated belt buckle according to claim 1, further comprising the light guide forms a groove and the shielding element is formed into the groove for enhanced connection between the light guide and the shielding element.

17. A method for producing an illuminated belt buckle for a safety belt device of a motor vehicle comprising the steps of:
   providing a housing,
   providing a push-button displaceable in the housing,
   forming an insertion slot, bordered by an edge section of the housing and the push-button, for inserting a latch plate lockable in the belt buckle,
   providing at least one light source and at least one light guide, wherein
   providing the light guide having two branches from a light entry surface such that two branches are separated from one another and coupled to at least one light-emitting surface, wherein
   arranging a shielding element between the branches of the light guide is a such that the shielding element shields the light guide at least from a housing part of the housing or a cavity in the interior of the housing in which the push-button is arranged, and wherein connecting a seat formed in the shielding element to a pin formed with the housing in a form fit.

18. The method in accordance with claim 17, further comprising the step of producing the light guide and the shielding element in a two component injection molding process.

19. The method in accordance with claim 17, further comprising the step of producing the light guide and the shielding element by an injection molding process.

20. An illuminated belt buckle for a safety belt device of a motor vehicle comprising,
- a housing,
- a push-button displaceable in the housing,
- an insertion slot, bordered by an edge section of the housing and the push-button, for inserting a latch plate lockable in the belt buckle, and
- at least one light source and at least one light guide,
- wherein the light guide is coupled to at least one light-emitting surface and a light entry surface receiving light from the light source,
- wherein a shielding element is arranged on the light guide, and shields the light guide at least from a housing part of the housing or a cavity in the interior of the housing in which the push-button is arranged, and
- wherein the light guide forms a groove and the shielding element is formed into the groove for enhanced connection between the light guide and the shielding element.

* * * * *